United States Patent
Klejsa et al.

(10) Patent No.: US 12,424,226 B2
(45) Date of Patent: Sep. 23, 2025

(54) METHODS AND SYSTEM FOR WAVEFORM CODING OF AUDIO SIGNALS WITH A GENERATIVE MODEL BY IMPLEMENTING A PROBABILITY DISTRIBUTION

(71) Applicants: Dolby Laboratories Licensing Corporation, San Francisco, CA (US); DOLBY INTERNATIONAL AB, Amsterdam (NL)

(72) Inventors: Janusz Klejsa, Solna (SE); Arijit Biswas, Bayern (DE); Lars Villemoes, Järfälla (SE); Roy M. Fejgin, San Francisco, CA (US); Cong Zhou, Foster City, CA (US)

(73) Assignees: Dolby Laboratories Licensing Corporation, San Francisco, CA (US); DOLBY INTERNATIONAL AB, Amsterdam (NL)

( * ) Notice: Subject to any disclaimer, the term of this patent is extended or adjusted under 35 U.S.C. 154(b) by 386 days.

(21) Appl. No.: 17/770,035

(22) PCT Filed: Oct. 16, 2020

(86) PCT No.: PCT/US2020/056162
§ 371 (c)(1),
(2) Date: Apr. 18, 2022

(87) PCT Pub. No.: WO2021/077023
PCT Pub. Date: Apr. 22, 2021

(65) Prior Publication Data
US 2022/0392458 A1    Dec. 8, 2022

Related U.S. Application Data

(60) Provisional application No. 62/923,225, filed on Oct. 18, 2019.

(30) Foreign Application Priority Data

Nov. 15, 2019 (EP) ..................... 19209362

(51) Int. Cl.
*G10L 19/00* (2013.01)
*G06F 40/35* (2020.01)
(Continued)

(52) U.S. Cl.
CPC .............. *G10L 19/00* (2013.01); *G10L 19/07* (2013.01); *G06F 40/35* (2020.01); *G06N 3/045* (2023.01); *G10L 15/00* (2013.01); *H04L 65/75* (2022.05)

(58) Field of Classification Search
CPC ....... H04L 65/75; G10L 19/097; G10L 19/00; G06N 3/045; G06F 40/35
(Continued)

(56) References Cited

U.S. PATENT DOCUMENTS 5,774,846 A    6/1998 Morii
6,233,550 B1   5/2001 Gersho
(Continued)

FOREIGN PATENT DOCUMENTS

CN    105103229 A    11/2015
CN    107516527 A    12/2017
(Continued)

OTHER PUBLICATIONS

Bastiaan Kleijn Wet Al: "Wavenet based low rate speech coding", arxiv.org, Cornell University Library, 201 Olin Library Cornell University Ithaca, NY 14853, Dec. 1, 2017, 5 pages.
(Continued)

*Primary Examiner* — Farzad Kazeminezhad
(74) *Attorney, Agent, or Firm* — Michael Best & Friedrich LLP

(57) ABSTRACT

Described herein is a method of waveform decoding, the method including the steps of: (a) receiving, by a waveform
(Continued)

decoder, a bitstream including a finite bitrate representation of a source signal; (b) waveform decoding the finite bitrate representation of the source signal to obtain a waveform approximation of the source signal; (c) providing the waveform approximation of the source signal to a generative model that implements a probability density function, to obtain a probability distribution for a reconstructed signal of the source signal; and (d) generating the reconstructed signal of the source signal based on the probability distribution. Described are further a method and system for waveform coding and a method of training a generative model.

19 Claims, 10 Drawing Sheets

(51) Int. Cl.
G06N 3/045 (2023.01)
G10L 15/00 (2013.01)
G10L 19/07 (2013.01)
H04L 65/75 (2022.01)

(58) Field of Classification Search
USPC .......................................................... 704/219
See application file for complete search history.

(56) References Cited

U.S. PATENT DOCUMENTS

| | | | |
|---|---|---|---|
| 6,664,913 B1 | 12/2003 | Craven | |
| 7,359,522 B2 | 4/2008 | Aarts | |
| 8,392,179 B2 | 3/2013 | Yu | |
| 10,334,202 B1* | 6/2019 | Zhou | G06N 3/045 |
| 2004/0002856 A1* | 1/2004 | Bhaskar | G10L 19/097 |
| | | | 704/219 |
| 2009/0326934 A1 | 12/2009 | Ono | |
| 2013/0066638 A1* | 3/2013 | Mason | G10L 19/00 |
| | | | 704/E21.001 |
| 2013/0110506 A1 | 5/2013 | Norvell | |
| 2015/0073784 A1 | 3/2015 | Gao | |
| 2017/0140755 A1* | 5/2017 | Andreas | G06F 40/35 |
| 2018/0336882 A1 | 11/2018 | Reber | |
| 2019/0051310 A1 | 2/2019 | Chang | |
| 2020/0176004 A1* | 6/2020 | Kleijn | G10L 19/00 |
| 2020/0411023 A1* | 12/2020 | Kim | H04L 65/75 |

FOREIGN PATENT DOCUMENTS

| | | | | |
|---|---|---|---|---|
| EP | 2372699 B1 | | 12/2012 | |
| JP | 2002368622 A | | 12/2002 | |
| JP | 7119631 | * | 6/2018 | G10L 15/22 |
| KR | 100664960 B1 | * | 10/2005 | G10L 15/00 |
| RU | 2407069 C2 | | 12/2010 | |
| WO | 9916050 W | | 4/1999 | |

OTHER PUBLICATIONS

Cristina Garbacea et al: "Low Bit-Rate Speech Coding with VQ-VAE and a WaveNet Decoder", arxiv.org, Cornell University Library, 201 Olin Library Cornell University Ithaca, NY 14853, Oct. 15, 2019, 5 pages.

Jan Skoglund et al: "Improving Opus Low Bit Rate Quality with Neural Speech Synthesis", arxiv.org, Cornell University Library, 201 Olin Library Cornell University Ithaca, NY 14853, May 12, 2019, 5 pages.

Jafari, M. G. et al "Fast Dictionary Learning for Sparse Representations of Speech Signals" IEEE Journal of Selected Topics in Signal Processing, IEEE, US, vol. 5, No. 5, Sep. 2, 2011 (Sep. 2, 2011), pp. 1025-1031 p. 1025-p. 1027.

Kadambe, S et al "Application of Adaptive wavelets for speech coding", Time-Frequency and Time-Scale Analysis, 1994., Proceedings of the IEEE-SP International Symposium on Philadelphia, PA, USA Oct. 25-28, 1994, Oct. 25, 1994 (Oct. 25, 1994), pp. 632-635.

Lim Wootaek et al: Harmonic and percussive source separation using a convolutional auto encoder 2017 25th European Signal Processing Conference (EUSIPCO), EURASIP, Aug. 28, 2017 (Aug. 28, 2017), pp. 1804-1808.

Michael Schoeffler, et al. "webMUSHRA—A Comprehensive Framework for Web-based Listening Tests", Journal of Open Research Software, ITU-R BS.1534, Feb. 2018, 8 Pages.

* cited by examiner

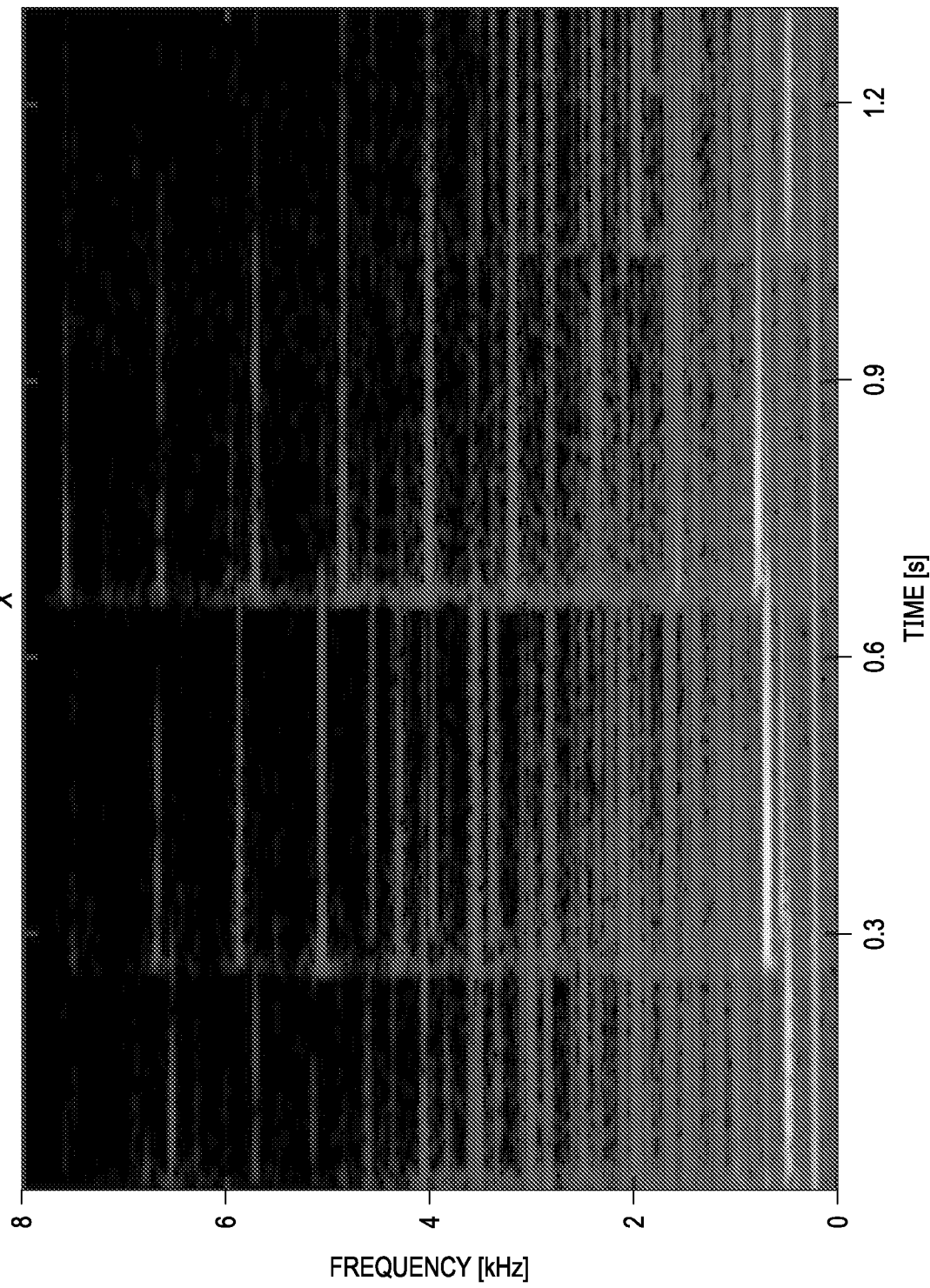

METHODS AND SYSTEM FOR WAVEFORM CODING OF AUDIO SIGNALS WITH A GENERATIVE MODEL BY IMPLEMENTING A PROBABILITY DISTRIBUTION

CROSS-REFERENCE TO RELATED APPLICATIONS

This application claims priority to European Patent Application No. 19209362.3 filed 15 Nov. 2019 and U.S. Provisional Patent Application No. 62/923,225, filed 18 Oct. 2019, which are incorporated herein by reference.

TECHNOLOGY

The present disclosure relates generally to a method of waveform decoding, and more specifically to waveform decoding of source signals with a generative model. The present disclosure further relates to a method and system for waveform coding and to a method of training a generative model.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Low-rate quantization of waveforms leads to coding artifacts. The perceptual effects of these artifacts are not well captured by commonly used sample distortion measures. For that reason, audio coding algorithms operating on a waveform are commonly equipped with heuristics aiming at improving the perceptual performance when signal quantization fails to reconstruct perceptually relevant features of the signal.

For example, in the context of transform audio coding, low bit-rate coding schemes typically introduce coding artifacts, such as spectral holes, or limit the bandwidth of the coded signal (as an outcome of optimization of the trade-off between bitrate and a sample distortion measure). To hide the coding artifacts, tools such as noise-fill or bandwidth extension are commonly used.

In addition, transform coding typically involves usage of simple quantizers (such a scalar quantizers). Due to the decorrelating property of the commonly used transforms, the performance gap towards vector quantization can be reduced. However, perfect decorrelation may be difficult to achieve. Hence, in many cases, additional measures are still necessary on the decoder side to further improve the performance of quantization, such as postfiltering.

Up to now, deep generative models were successfully used for speech coding providing a significant improvement to the perceptual quality-bitrate trade-off. These schemes comprised an encoder computing a parametric (finite bitrate) representation of speech, and a decoder based on a generative model. The speech signal was reconstructed by sampling from a trained probability distribution conditioned on the parametric representation.

Generative models were also used for synthesis of audio signals. However, their application to audio coding remains an open problem.

An application that is closest to a coding problem is a scheme of the Magenta Project, where piano waveforms were encoded into MIDI-like representation, and then reconstructed from it. This resembles conceptually the mentioned speech coding schemes, where an encoder provides a salient parametric description of the signal to be generated. Perhaps, the most obvious disadvantage of such an approach for audio is that the set of salient parameters would depend on signal category (e.g., MIDI-like parametrization would not be suitable to speech).

While deep neural networks have already been applied to the audio coding problem, these schemes are based on discriminative networks that lack the generative power of models that reconstruct the signal by sampling from a learned probability distribution. Generative modelling provides means for synthesis of plausible signal structures, enabling powerful techniques optimizing perceptual performance such as bandwidth extension, or noise-fill of signal structures that would otherwise be lost due to signal quantization. Signal quantizers capable of providing source matching noise-filling were also proposed. However, these schemes were limited to scalar quantizers and simple probability distributions describing the source.

Accordingly, there is an existing need for methods, apparatus and system for waveform coding of audio signals with a generative model.

SUMMARY

In accordance with a first aspect of the present disclosure there is provided a method of waveform decoding. The method may include the step of (a) receiving, by a waveform decoder, a bitstream including a finite bitrate representation of a source signal. The method may further include the step of (b) waveform decoding the finite bitrate representation of the source signal to obtain a waveform approximation of the source signal. The method may further include the step of (c) providing the waveform approximation of the source signal to a generative model that implements a probability density function, to obtain a probability distribution for a reconstructed signal of the source signal. And the method may include the step of (d) generating the reconstructed signal of the source signal based on the probability distribution.

Configured as above, the method described allows for combining the advantages of waveform coding and parametric coding in a seamless manner. In particular, the perceptual performance of waveform coded audio may be improved.

In some embodiments, in step (d) the reconstructed signal may be generated by generating a random sample according to the probability distribution, or in step (d) the reconstructed signal may be generated by averaging samples according to the probability distribution.

In some embodiments, in step (a) the received bitstream may further include one or more auxiliary parameters represented at finite bitrate, and optionally the one or more auxiliary parameters may include an indication on an energy per frequency band for at least one frequency band and/or a spectral envelope of the source signal.

In some embodiments, in step (a) the received bitstream may further include information indicative of a content type of the source signal, and/or in step (a) the received bitstream may further include information indicative of an operating bitrate of a coding scheme.

In some embodiments, step (c) may further include selecting the generative model from a predefined set of generative models based on the information indicative of the content type of the source signal, and/or step (c) may further include selecting the generative model from a predefined set of generative models based on the information indicative of the operating bitrate of the coding scheme.

In some embodiments, the method may further include a step of determining that the waveform approximation of the source signal shall be output as the reconstructed signal of the source signal based on the information indicative of the content type of the source signal and/or based on the information indicative of the operating bitrate of the coding scheme.

In some embodiments, the generative model may operate with a look-ahead. In this, the operational performance of the generative model may be improved.

In some embodiments, the generative model may have been trained to operate in the signal domain.

In some embodiments, the generative model may operate in an autoregressive manner, or the generative model may operate to reconstruct an entire frame of the source signal at once.

In some embodiments, the generative model in step (c) may be a generative model that implements a conditional probability density function, and the generative model may be conditioned on the waveform approximation of the source signal and optionally on the one or more auxiliary parameters. In this, the method is capable to provide competitive perceptual performance to other waveform coding schemes commonly used in the context of audio coding.

In some embodiments, the generative model may be an explicit density model, such as a tractable density model. In some embodiments, the generative model may be an autoregressive neural network, such as a convolutional neural network (CNN) (e.g. WaveNet) or a recurrent neural network (RNN) (e.g sampleRNN). In some embodiments the generative model may include a conditional flow model.

In some embodiments, the generative model may be a conditional sampleRNN neural network, and optionally the conditional sampleRNN neural network may be a four-tier sampleRNN with the conditioning provided to each tier through convolutional layers.

In some embodiments, the finite bitrate representation of the source signal may have been obtained by a waveform encoder generating a bitstream including the finite bitrate representation of the source signal, and optionally further one or more auxiliary parameters may be provided by the waveform encoder and included in the bitstream.

In some embodiments, the waveform encoder may be a deterministic waveform encoder.

In some embodiments, further one or more source classifiers providing information indicative of a content type of the source signal may be provided by the waveform encoder and included in the bitstream, and/or further information indicative of an operating bitrate of a coding scheme may be provided by the waveform encoder and included in the bitstream.

In accordance with a second aspect of the present disclosure there is provided a method for waveform coding. The method may include the step of (a) operating, by a waveform encoder, on a source signal to obtain a bitstream including a finite bitrate representation of the source signal. The method may further include the step of (b) receiving, by a waveform decoder, the bitstream including the finite bitrate representation of the source signal. The method may further include the step of (c) waveform decoding the finite bitrate representation of the source signal to obtain a waveform approximation of the source signal. The method may further include the step of (d) providing the waveform approximation of the source signal to a generative model that implements a probability density function, to obtain a probability distribution for a reconstructed signal of the source signal. And the method may include the step of (e) generating the reconstructed signal of the source signal based on the probability distribution.

In accordance with a third aspect of the present disclosure there is provided a system for waveform coding, wherein the system includes a waveform encoder and a waveform decoder, and wherein the system is configured to perform the method for waveform coding.

In accordance with a fourth aspect of the present disclosure there is provided a method of training a generative model. The method may include the step of (a) providing an original signal of a source signal. The method may further include the step of (b) waveform encoding and decoding the original signal of the source signal to obtain a waveform approximation of the source signal. The method may further include the step of (c) inputting the waveform approximation of the source signal into the generative model to obtain a parametrized function for a probability distribution. And the method may include the step of (d) tuning the parameters of the generative model to maximize a likelihood of the original source signal based on the probability distribution obtained from said generative model.

In some embodiments, the generative model may be conditioned on the waveform approximation of the source signal and optionally on one or more auxiliary parameters.

In some embodiments, in step (d) the parameters of the generative model may be tuned based on minimizing a mean over a dataset of a Negative-Log-Likelihood.

In some embodiments, in step (c) further a reconstructed signal of the source signal may be generated based on the probability distribution, and in step (d) the parameters of the generative model may be tuned based on minimizing an indication of a difference between the reconstructed signal of the source signal and the original signal of the source signal.

BRIEF DESCRIPTION OF THE DRAWINGS

Example embodiments of the disclosure will now be described, by way of example only, with reference to the accompanying drawings in which:

FIG. 11a-c illustrate spectrograms for a piano coding task, with FIG. 11a showing a reference X, FIG. 11b showing a waveform baseline $\hat{X}$ and FIG. 11c showing a reconstructing using an embodiment of a coding method using a generative model $\tilde{X}$.

DESCRIPTION OF EXAMPLE EMBODIMENTS

Generative Models for Waveform Coding

Methods, apparatus and system described herein aim at improving the perceptual performance of waveform coded audio. In particular, it is possible to facilitate bandwidth extension and filling of spectral holes with plausible structures; interleaved waveform coding and bandwidth extension; and improved performance in terms of sample distortion measure. Methods, apparatus and system described herein provide a source coding scheme based on a generative model that combines advantages of waveform coding and parametric coding in a seamless manner. When trained for a specific signal category (content type), the scheme outperforms state-of-the-art source coding techniques. Moreover, the coding scheme can be used together with a perceptual model for allocating the coding distortion. The operation of the scheme and its performance can be described and predicted analytically.

A Method of Waveform Decoding with a Generative Model

Figure 1:
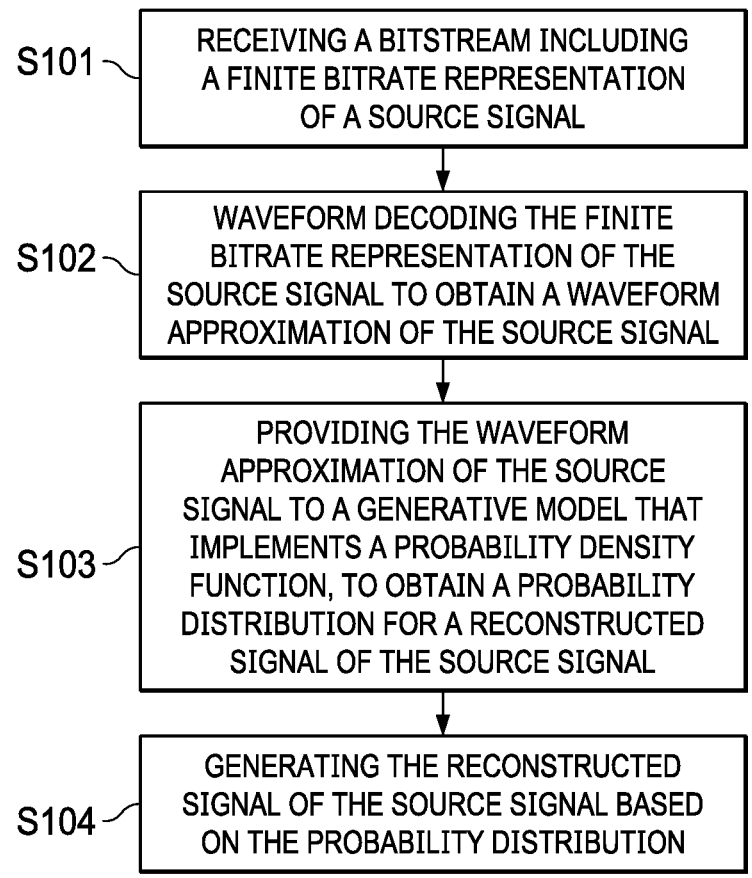
FIG. 1 illustrates a flow diagram of an example of a method of waveform decoding with a generative model.

Referring to the example of FIG. 1, a flow diagram of an example of a method of waveform decoding with a generative model is illustrated. In step S101, a bitstream including a finite bitrate representation of a source signal is received by a waveform decoder. In an embodiment, the finite bitrate representation of the source signal may have been obtained by a waveform encoder generating a bitstream including the finite bitrate representation of the source signal. In an embodiment, the waveform encoder may be a deterministic waveform encoder.

In step S102, the finite bitrate representation of the source signal is waveform decoded to obtain a waveform approximation of the source signal.

In step S103, the waveform approximation of the source signal is provided to a generative model that implements a probability density function, to obtain a probability distribution for a reconstructed signal of the source signal. In an embodiment, the generative model may operate with a look-ahead. In an embodiment, the generative model may have been trained to operate in the signal domain.

In step S104, the reconstructed signal of the source signal is then generated based on the probability distribution. In an embodiment, in step S104, the reconstructed signal may be generated by generating a random sample according to the probability distribution. Alternatively, in step S104, the reconstructed signal may be generated by averaging samples according to the probability distribution.

The methods of waveform decoding described herein may be implemented on a respective waveform decoder comprising one or more processors configured to perform said methods.

A method for waveform coding may be implemented on a system including a waveform encoder and a waveform decoder. The method may include the step of (a) operating, by a waveform encoder, on a source signal to obtain a bitstream including a finite bitrate representation of the source signal. The method may further include the step of (b) receiving, by a waveform decoder, the bitstream including the finite bitrate representation of the source signal. The method may further include the step of (c) waveform decoding the finite bitrate representation of the source signal to obtain a waveform approximation of the source signal. The method may further include the step of (d) providing the waveform approximation of the source signal to a generative model that implements a probability density function, to obtain a probability distribution for a reconstructed signal of the source signal. And the method may include the step of (e) generating the reconstructed signal of the source signal based on the probability distribution.

It is to be noted that the waveform decoder of the system described above may alternatively or additionally also be configured to perform the methods of waveform decoding as described herein.

The methods described herein may further be implemented as a computer program product comprising a computer-readable storage medium with instructions adapted to cause the device to carry out said methods when executed by a device having processing capability.

A Method of Waveform Decoding with a Conditioned Generative Model

In an embodiment, the generative model may be a generative model that implements in step S103 a conditional probability density function, wherein the generative model may be conditioned on the waveform approximation of the source signal.

Figure 2:
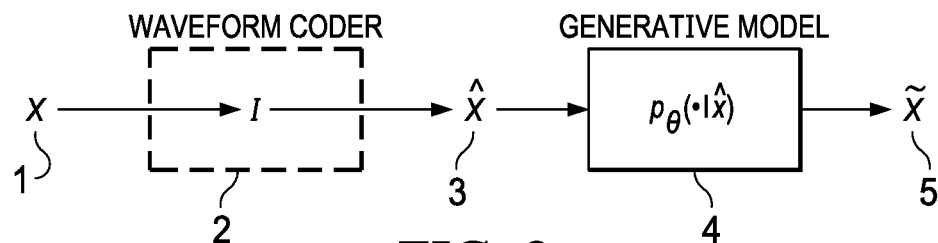
FIG. 2 schematically illustrates an example of a method of waveform coding with a generative model conditioned on a waveform approximation of a source signal implemented by a system of a waveform coder and the generative model.

Referring now to the example of FIG. 2, a method of waveform coding with a generative model conditioned on a waveform approximation of a source signal implemented by a system of a waveform coder and the generative model is illustrated.

In general, it is to be noted that throughout this disclosure upper case letters may be used for random variables and lower case letters may be used for their realizations.

In the example of FIG. 2, a finite bitrate (parametric) representation, I, 2, of a source signal, X, 1, is provided by a waveform encoder. For example, the waveform encoder may operate on source signal samples blocked into vectors represented by X, 1, to obtain the finite bitrate representation of the source signal, I, 2. The waveform encoder may be (conveniently) optimized for a bitrate-distortion trade-off (by using a sample-distortion measure, e.g., perceptually weighted squared error).

Waveform decoding, for example by a waveform decoder, the finite bitrate representation, I, 2, of the source signal, X, 1, then yields the waveform approximation, $\hat{X}$, 3, of the source signal, X, 1, on which the generative model may be conditioned, 4. The conditioned generative model, 4, may then implement a conditional probability density function, to obtain a conditional probability distribution (1):

$$p_\theta(\cdot|\hat{x}) \qquad (1)$$

A reconstructed signal, $\tilde{X}$, 5, of the source signal, X, 1, may then be generated based on random sampling from or averaging samples according to the conditional probability distribution $p_\theta$.

The structure of the waveform coding system (scheme) thus illustrated in the example of FIG. 2 is capable to provide competitive perceptual performance to other source (waveform) coding schemes commonly used in the context of audio coding.

Figure 3:
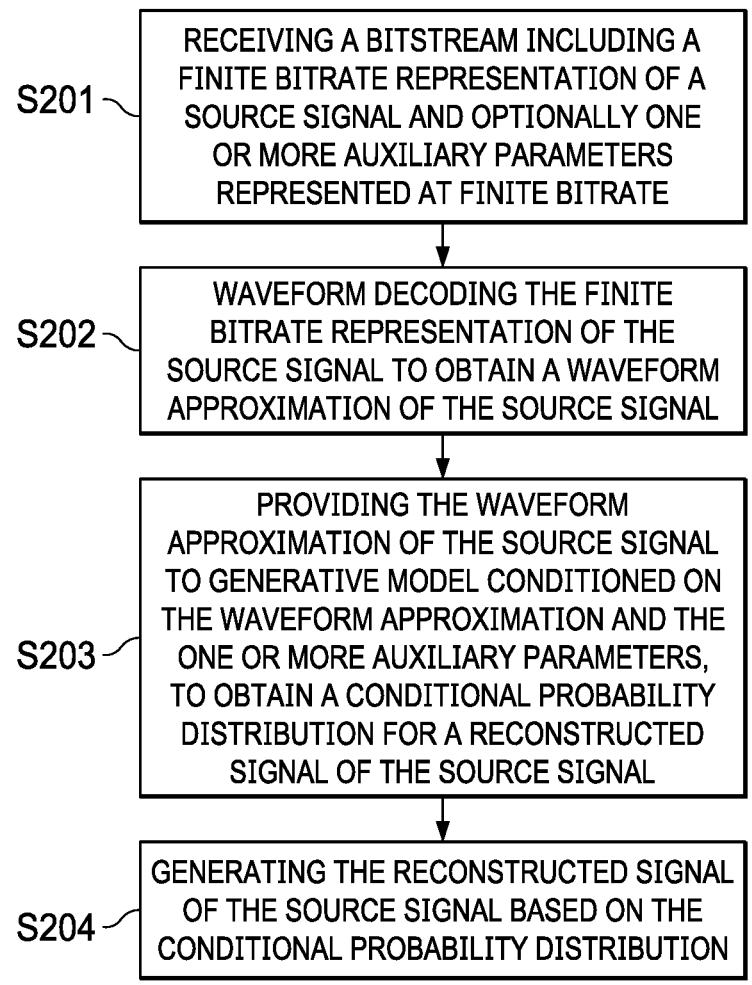
FIG. 3 illustrates a flow diagram of an example of a method of waveform decoding with a generative model conditioned on a waveform approximation of a source signal and one or more auxiliary parameters.

Referring now to the example of FIG. 3, a flow diagram of an example of a method of waveform decoding with a generative model conditioned on a waveform approximation of a source signal and one or more auxiliary parameters is illustrated.

In step S201, a bitstream including a finite bitrate representation of a source signal and one or more auxiliary parameters represented at finite bitrate may be received by a waveform decoder. The one or more auxiliary parameters may include an indication on an energy per frequency band for at least one frequency band and/or a spectral envelope of the source signal. The finite bitrate representation of the source signal and the one or more auxiliary parameters represented at finite bitrate may have been provided by a waveform encoder. In an embodiment, the waveform encoder may be a deterministic waveform encoder.

In step S202, the finite bitrate representation of the source signal may be waveform decoded to obtain a waveform approximation of the source signal.

In step S203, the waveform approximation of the source signal may be provided to a generative model conditioned on the waveform approximation of the source signal and the one or more auxiliary parameters. The generative model may thus implement a conditional probability density function, to obtain a conditional probability distribution for a reconstructed signal of the source signal.

In step S204, the reconstructed signal of the source signal may then be generated based on the conditional probability distribution. In an embodiment, in step S204, the reconstructed signal may be generated by generating a random sample according to the conditional probability distribution. Alternatively, in step S204, the reconstructed signal may be generated by averaging samples according to the conditional probability distribution.

Figure 4:
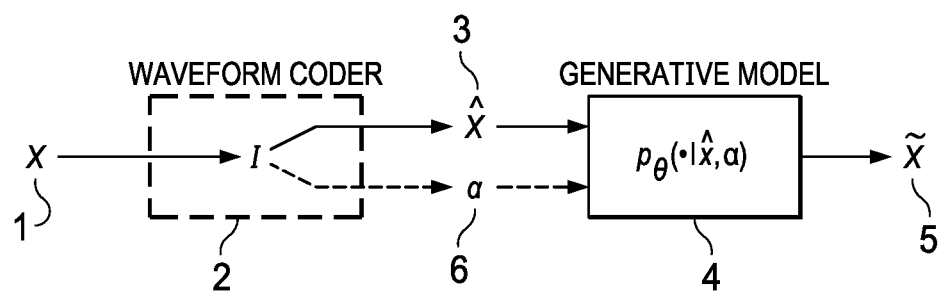
FIG. 4 schematically illustrates an example of a method of waveform coding with a generative model conditioned on a waveform approximation of a source signal and one or more auxiliary parameters implemented by a system of a waveform coder and the generative model.

Referring now to the example of FIG. 4, an example of a method of waveform coding with a generative model conditioned on a waveform approximation of a source signal and one or more auxiliary parameters implemented by a system of a waveform coder and the generative model is schematically illustrated. In the example of FIG. 4, analogue to the example of FIG. 2, a finite bitrate representation, I, 2, of a source signal, X, 1, is provided by a waveform encoder. For example, the waveform encoder may operate on source signal samples blocked into vectors represented by X, 1, to obtain the finite bitrate representation of the source signal, I, 2. The waveform encoder may be (conveniently) optimized for a bitrate-distortion trade-off (by using a sample-distortion measure, e.g., perceptually weighted squared error). Further, one or more (a set of) auxiliary parameters, α, 6, represented at finite bitrate may also be provided by the waveform encoder.

Waveform decoding, for example by a waveform decoder, the finite bitrate representation, I, 2, of the source signal, X, 1, then yields the waveform approximation, $\hat{X}$, 3, of the source signal, X, 1. In the example of FIG. 4, the generative model, 4, may be conditioned on both the waveform approximation, $\hat{X}$, 3, of the source signal, X, 1, and the one or more auxiliary parameters, α, 6. The conditioned generative model, 4, may then implement a conditional probability density function, to obtain a conditional probability distribution (2) as follows:

$$p_\theta(\cdot|\hat{x},\alpha) \qquad (2)$$

A reconstructed signal, $\tilde{X}$, 5, of the source signal, X, 1, may then be generated based on random sampling from or averaging samples according to the above conditional probability distribution $p_\theta$. The structure of the waveform coding system (scheme) thus illustrated in the example of FIG. 4 is also capable to provide competitive perceptual performance to other source (waveform) coding schemes commonly used in the context of audio coding.

A Method of Waveform Decoding with a Predefined Set of Generative Models

Figure 5:
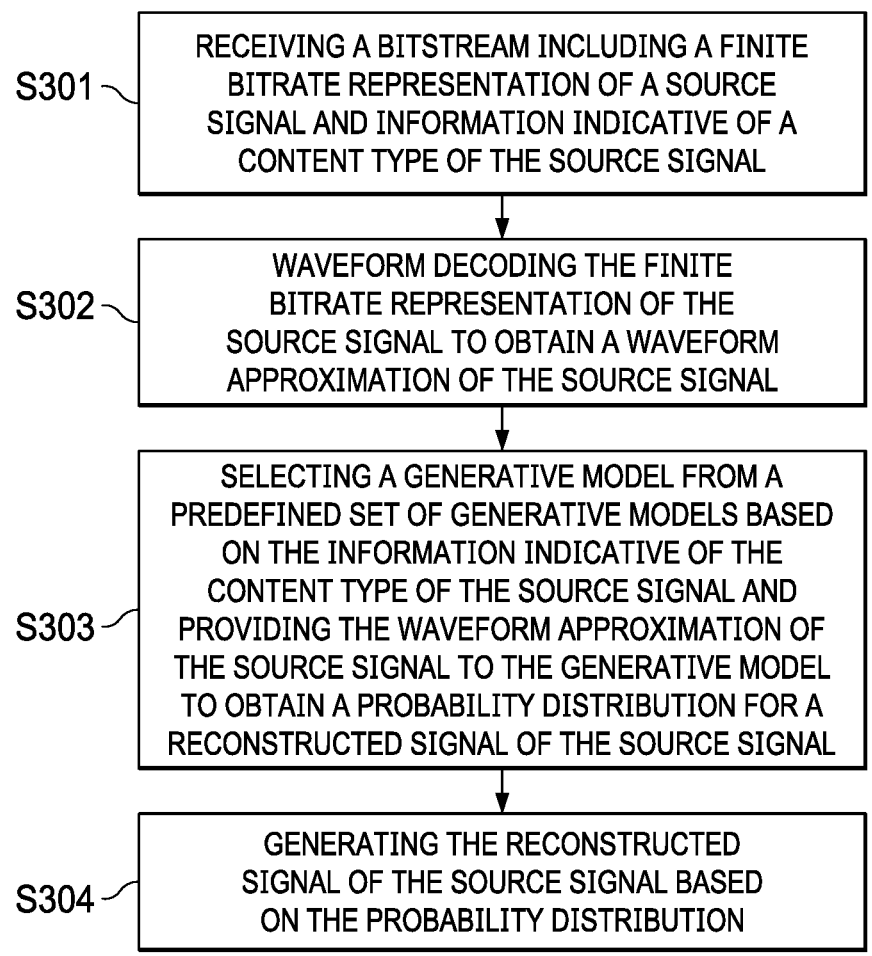
FIG. 5 illustrates a flow diagram of an example of a method of waveform decoding with a generative model selected from a predefined set of generative models.

Referring now to the example of FIG. 5, a flow diagram of an example of a method of waveform decoding with a generative model selected from a predefined set of generative models is illustrated. In step S301, the received bitstream may include a finite bitrate representation of a source signal and information indicative of a content type of the source signal. In an embodiment, one or more source classifiers providing the information indicative of the content type of the source signal may be provided by a waveform encoder and included in the bitstream. Content type of the source signal may refer, for example, to a signal category of the source signal. The signal category may include in a non-limiting manner one or more of speech, reverberant speech, applause and music.

While in the example of FIG. 5, the bitstream is illustrated to include information indicative of a content type of the source signal, alternatively, or additionally, in an embodiment, the bitstream may further include information indicative of an operating bitrate of a coding scheme.

In step S302, the finite bitrate representation of the source signal may be waveform decoded to obtain a waveform approximation of the source signal.

In step S303, a generative model may be selected, for example by a model selector, from a predefined set of generative models based on the information indicative of the content type of the source signal. In this, the bitstream received by the waveform decoder (i.e. sent by the waveform encoder) contains information that allows determining (selecting) the generative model to be used from a predefined set of generative models at the waveform decoder side. The determination (selection) may be facilitated, for example, on a frame basis. For example, the generative models in the predefined set of generative models may be enumerated and the information indicative of the content type of the source signal may be provided as a number indicating the generative model to be used out of the predefined set of generative models.

As already mentioned above, alternatively, or additionally, in an embodiment, the bitstream may further include information indicative of an operating bitrate of a coding scheme. In this case, in step S302, the generative model may also be selected from the predefined set of generative models based on the information indicative of the operating bitrate of the coding scheme. For example, the coding scheme may facilitate operation at three different bitrates R1<R2<R3. For each bitrate, there may be a separate (individual) generative model trained for that bitrate. In this case, the operating bitrate may be indicated in the bitstream, for example, by enumerating the possible bitrates. The generative model may then be selected, for example by the model selector, based on this information, i.e. there may be a separate generative model for bitrate R1, a separate model for bitrate R2 and a separate model for bitrate R3. While in this example, three different bitrates are denoted, the number of possible bitrates may, however, be arbitrary. For example, a generative model may be provided for 16 kbps speech and another generative model may be provided for 32 kbps speech.

The waveform approximation of the source signal may then be provided to the selected generative model that implements a probability density function, to obtain a probability distribution for a reconstructed signal of the source signal. The selected generative model may be a generative model conditioned on the waveform approximation of the source signal. Additionally, the received bitstream may further include one or more auxiliary parameters represented at finite bitrate and the selected generative model may further be conditioned on the one or more auxiliary parameters as described above.

In step S304, the reconstructed signal of the source signal may then be generated based on the probability distribution, which may be a conditional probability distribution depending on the selected generative model. In an embodiment, in step S304, the reconstructed signal may be generated by generating a random sample according to the probability distribution. Alternatively, in step S304, the reconstructed signal may be generated by averaging samples according to the probability distribution.

In an embodiment, the method may further include a step of determining that the waveform approximation of the source signal shall be output as the reconstructed signal of the source signal based on the information indicative of the content type of the source signal. A pass-through mode may thus be implemented. For example, a generative model may be selected for the signal category speech only, other signal categories may then be passed through. A generative model may also be selected for applause signals only and other signal categories may be passed through. Further, generative models may also be selected for the signal categories of speech and applause, respectively, while other signal categories may then be passed through, for example music or reverberant speech. Further, the pass-through mode may also be implemented in a case where none of the generative models in the predefined set of generative models has been trained for a respective signal category. The reconstructed signal may then be provided by the waveform decoder.

Alternatively, or additionally, determining that the waveform approximation of the source signal shall be output as the reconstructed signal of the source signal may also be based on the information indicative of the operating bitrate of the coding scheme. A pass-through mode may thus be implemented. The pass-through mode may be implemented in particular for high bitrates.

Figure 6:
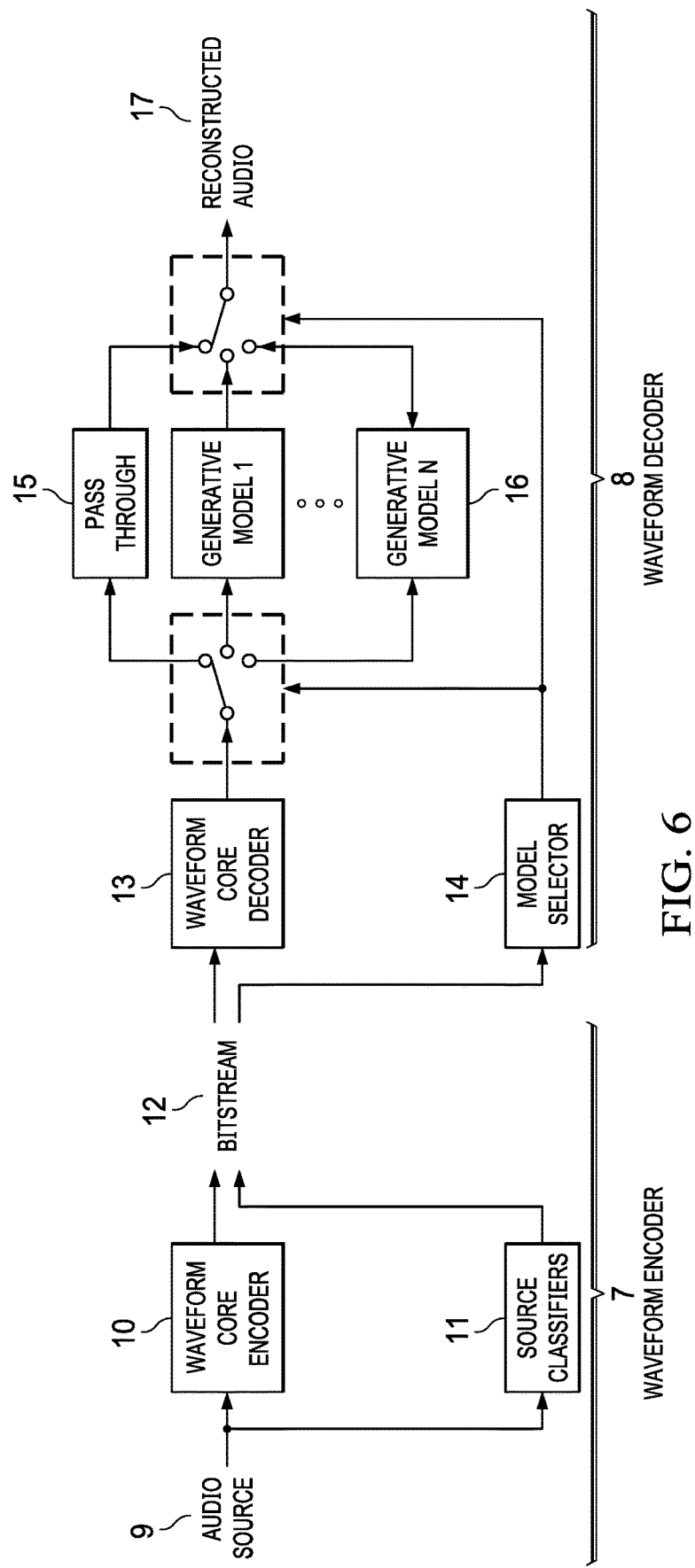
FIG. 6 schematically illustrates an example of a method of waveform coding with a generative model selected from a predefined set of generative models implemented by a system of a waveform encoder and a waveform decoder.

Referring now to the example of FIG. 6, an example of a method of waveform coding with a generative model selected from a predefined set of generative models implemented by a system of a waveform encoder and a waveform decoder is illustrated.

A waveform encoder, 7, may provide a bitstream, 12, including a finite bitrate representation of a source signal, obtained by a waveform core encoder, 10, operating on an audio source signal, 9. In an embodiment, the waveform encoder, 7, may further be configured to provide information indicative of an operating bitrate of a coding scheme, and to include the information indicative of the operating bitrate of the coding scheme in the bitstream, 12. One or more source classifiers, 11, may further be provided by the waveform encoder, 7, and included in the bitstream, 12.

The bitstream, 12, may be received by a waveform decoder, 8. The waveform decoder, 8, may include a waveform core decoder, 13, configured to waveform decode the finite bitrate representation of the source signal to obtain a waveform approximation of the source signal. The waveform decoder, 8, may further include a model selector, 14, configured to select a generative model from a predefined set of generative models 1 . . . N, 16, based on information indicative of the content type of the source signal provided by the one or more source classifiers, 11. The content type of the source signal may refer, for example, to a signal category of the source signal. For example, each of the generative models in the predefined set of generative models 1 . . . N, 16, may be trained to reconstruct a signal category. The signal category may include in a non-limiting manner one or more of speech, reverberant speech, applause and music. The information indicative of the content type of the source signal thus allows the model selector, 14, to select (determine) the generative model to be used out of the predefined set of generative models, 1 . . . N, 16. This may be facilitated, for example, on a frame basis. For example, the generative models in the predefined set of generative models 1 . . . N, 16, may be enumerated and the information indicative of the content type of the source signal may further include and/or be a number indicating the generative model to be used.

Alternatively, or additionally, in an embodiment, the model selector, 14, may further be configured to select the generative model from the predefined set of generative models 1 . . . N, 16, based on information indicative of an operating bitrate of a coding scheme. For example, the predefined set of generative models 1 . . . N, 16, may include generative models separately trained with respect to a target operating bitrate. For example, if the coding scheme facilitates operation at three different bitrates R1<R2<R3, there may be three separately trained generative models for each of the bitrates. The operating bitrate may be indicated in the bitstream received by the waveform decoder, 8, for example, by enumerating possible bitrates, wherein the number of possible bitrates may be arbitrary. The model selector, 14, may then be configured to select the generative model to be used based on this information. In this case, the generative models in the predefined set of generative models 1 . . . N, 16, may also be enumerated, accordingly. For example, the predefined set of generative models 1 . . . N, 16, may include a generative model for 16 kbps speech and another generative model for 32 kbps speech.

The waveform approximation of the source signal may then be provided to the selected generative model out of the predefined set of generative models 1 . . . N, 16, that implements a probability density function, to obtain a probability distribution for a reconstructed signal of the source signal. The reconstructed signal of the source signal, 17, may then be generated and output by the waveform decoder, 8, based on the probability distribution.

The model selector, 14, may further be configured to determine that the waveform approximation of the source signal shall be output as the reconstructed signal of the source signal, 17, based on the information indicative of the content type of the source signal provided by the one or more source classifiers, 11, as indicated by the pass through selection, 15. Alternatively, or additionally, the model selector, 14, may further be configured to determine that the waveform approximation of the source signal shall be output as the reconstructed signal of the source signal, 17, based on the information indicative of the operating bitrate of the coding scheme, as indicated by the pass through selection, 15. For example, if the operating bitrate is indicated to be 32 kbps speech and the predefined set of generative models 1 . . . N, 16, would not include a generative model trained for this bitrate, the model selector, 14, may be configured to by-pass the predefined set of generative models, 16, as indicated by the pass through selection, 15.

Waveform Coder

Figure 7:
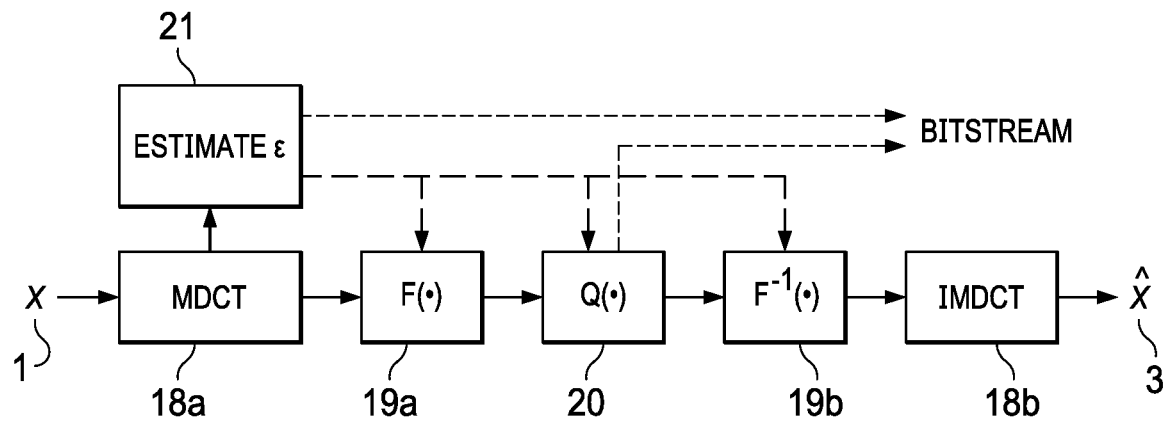
FIG. 7 schematically illustrates an example of a system of a waveform encoder and a waveform decoder.

In the following, an example of a waveform coder (system of a waveform encoder and a waveform decoder) will be described based on the example illustrated in FIG. 7. A waveform coder operating in the MDCT domain may be used. The input source signal X, 1, may be framed to facilitate application of an MDCT, 18a, with a stride of 320 samples (at a sampling frequency of $f_s$=16 kHz). The coefficients of the transform may be blocked into N non-uniform, non-overlapping frequency bands. For an n-th band, a variance of the coefficients may be computed and quantized with a 3 dB step, yielding an index $i_{env}(n)$. The quantized values may be blocked into a vector ε, 21, and coded into a bitstream using frequency differential coding with a Huffman codebook.

On the encoder side, the MDCT coefficients may first be spectrally flattened by F(•), 19a, according to the envelope ε, 21. The flattened MDCT lines may then be quantized by a set of quantizers selected to fulfil a per frame bitrate constraint. The set of quantizers [m0, ..., $m_M$] may be ordered providing incremental increases of SNR by 1.5 dB between each $m_n$ and $m_{n+1}$. Each $m_n$ may be associated with a Huffman code-book.

For every coded block, the rate allocation process may be constrained by the total number of bits allocated to that block. It may be controlled by $m_n=i_{env}(n)-i_{offset}$, where $i_{offset}$ may be an integer common to all the frequency bands and $m_n$ may be limited so that $0 \leq m_n \leq M$. The value of $i_{offset}$ may be determined by a binary search, which resembles the reverse water-filling procedure in a perceptually weighted domain. The perceptual effect of this rate allocation may be that the SNR within a frame would be allocated proportionally to the square root of the spectral envelope (allocating 1.5 dB SNR increase for every increase of the in-band envelope value by 3 dB).

On the decoder side, the MDCT lines may be reconstructed in the flattened domain and then the inverse spectral flattening $F^{-1}(\bullet)$, 19b, may be applied. The inverse flattening is controlled by ε, 21, which may be decoded from the bitstream along with quantized transform coefficients and the rate allocation parameter $i_{offset}$.

Conditional SampleRNN

The generative model to which the waveform approximation of the source signal is provided is not limited. In an embodiment, the generative model may operate in an autoregressive manner, or the generative model may operate to reconstruct an entire frame of the source signal at once. In an embodiment, a conditional sampleRNN neural network may be used. In the following, an example of a specific sampleRNN neural network will be described which is not intended to be limiting. In general, a sampleRNN is a deep neural generative model for generating raw audio signals by sampling them from a trained model. It consists of a series of multi-rate recurrent layers which are capable of modeling the dynamics of a sequence at different time scales and a multilevel perceptron (MLP) allowing usage of parameterized simple distributions. SampleRNN models the probability of a sequence of audio samples blocked in x by factorization of the joint distribution into the product of the scalar sample distributions conditioned on all previous samples. This facilitates an efficient implementation, where a single scalar sample is drawn at a time.

The generative model may be conditioned according to $p_\theta(x|y)$. The scalar samples blocked in x may be denoted by [$s_0, \ldots, s_n$]. Then the model may operate recursively according to (3):

$$p_\theta(x|y) = \Pi_{i=1}^{T} p(s_i|s_1, \ldots, s_{i-1}, y) \quad (3)$$

In an embodiment, the conditional sampleRNN neural network may be a four-tier sampleRNN with the conditioning provided to each tier through convolutional layers. The output layer may utilize the discretized mix of logistics technique to generate 16-bit outputs. The model may be conditioned on y comprising frames of signal domain samples reconstructed by the waveform codec and the associated values of the quantized signal envelope in ε. In an embodiment, the generative model may operate with a look-ahead which may improve the performance. This may be done by processing the conditioning vector with 3×1 convolution layer, which may result in a look-ahead of two codec frames. In addition to the conditioning described above, the MLP block may have access to the coded waveform processed through a convolutional layer utilizing a 1×319 kernel centered on the sample aligned with the prediction target.

Training of a Generative Model

In general, training of the generative model to which the waveform approximation of the source signal is provided is not limited. Training of the generative model may be adapted to the type of generative model used and the conditioning that may be applied. However, a method of training a generative model may include the step of (a) providing an original signal of a source signal. The method may further include the step of (b) waveform encoding and decoding the original signal of the source signal to obtain a waveform approximation of the source signal. The method may further include the step of (c) inputting the waveform approximation of the source signal into the generative model to obtain a parametrized function for a probability distribution. And the method may include the step of (d) tuning (training) the parameters of the generative model to maximize a likelihood of the original source signal based on the probability distribution obtained from said generative model.

Training of the generative model may also involve conditioning. In an embodiment, the generative model may be conditioned on the waveform approximation of the source signal and optionally on one or more auxiliary parameters. More specifically, the training dataset may be constructed in the following manner. Each signal in the set of signals (which are used for the training) is divided into frames. Furthermore, each signal is coded by the waveform codec yielding reconstructed waveform and/or auxiliary parameters that are divided into frames, so that an alignment of the samples of uncoded signal and waveform coded signal is possible.

As already mentioned above, the type of training applied is not limited. In an embodiment, in step (c) further a reconstructed signal of the source signal may be generated based on the parametrized function for a probability distribution, and in step (d) the parameters of the generative model may be tuned based on minimizing an indication of a difference between the reconstructed signal of the source signal and the original signal of the source signal.

The generative model may also be trained based on an objective. In an embodiment, in step (d) the parameters of the generative model may be tuned based on minimizing a mean over a dataset of a Negative-Log-Likelihood (NLL). NLL may thus be used as the training objective. The generative model may thus further be optimized for some distribution match.

Figure 8:
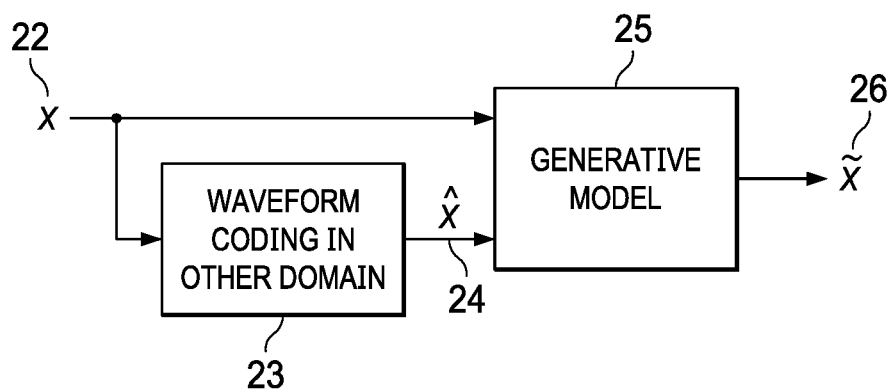
FIG. 8 schematically illustrates an example of a method of training a generative model.

Referring now to the example of FIG. 8, an example of a method of training a generative model is schematically illustrated. An original source signal, X, 22, may be waveform coded, i.e. waveform encoded and decoded, 23, to obtain a waveform approximation of the source signal X̂, 24. The waveform coding may be facilitated in a domain different from the domain the generative model is trained in.

A waveform coder (providing waveform match) optimized for a trade-off between available bitrate and sample distortion (for example weighted squared error) may be used. In an embodiment, the generative model may be trained to operate in the signal domain. The generative model may further be trained to reconstruct a signal category. The signal category may include in a non-limiting manner one or more of speech, reverberant speech, applause and music. Alternatively, or additionally, the generative model may further be trained with respect to a (target) operating bitrate, for example 16 kbps speech or 32 kbps speech.

The waveform approximation of the source signal $\hat{X}$, 24, and the original source signal, X, 22, may be input into the generative model, 25. The generative model, 25, may implement a probability density function, to obtain a probability distribution based on which the reconstructed signal of the source signal, $\tilde{X}$, 26, may then be obtained. The parameters of the generative model, 25, may be tuned based on the quality of the reconstructed signal of the source signal, $\tilde{X}$, 26, in view of the original source signal, X, 22.

Experimental Results

Experiments were conducted using the exemplary conditional four-tier sampleRNN model described above, with NLL as the training objective. A subjective evaluation of two coding tasks was performed. The first task comprised coding of piano excerpts. The second task comprised coding of speech. The results were compared against state-of-the-art codecs that are meant to represent source coding tools that would be typically used for the specific signal category considered in a coding tasks.

Figure 9:
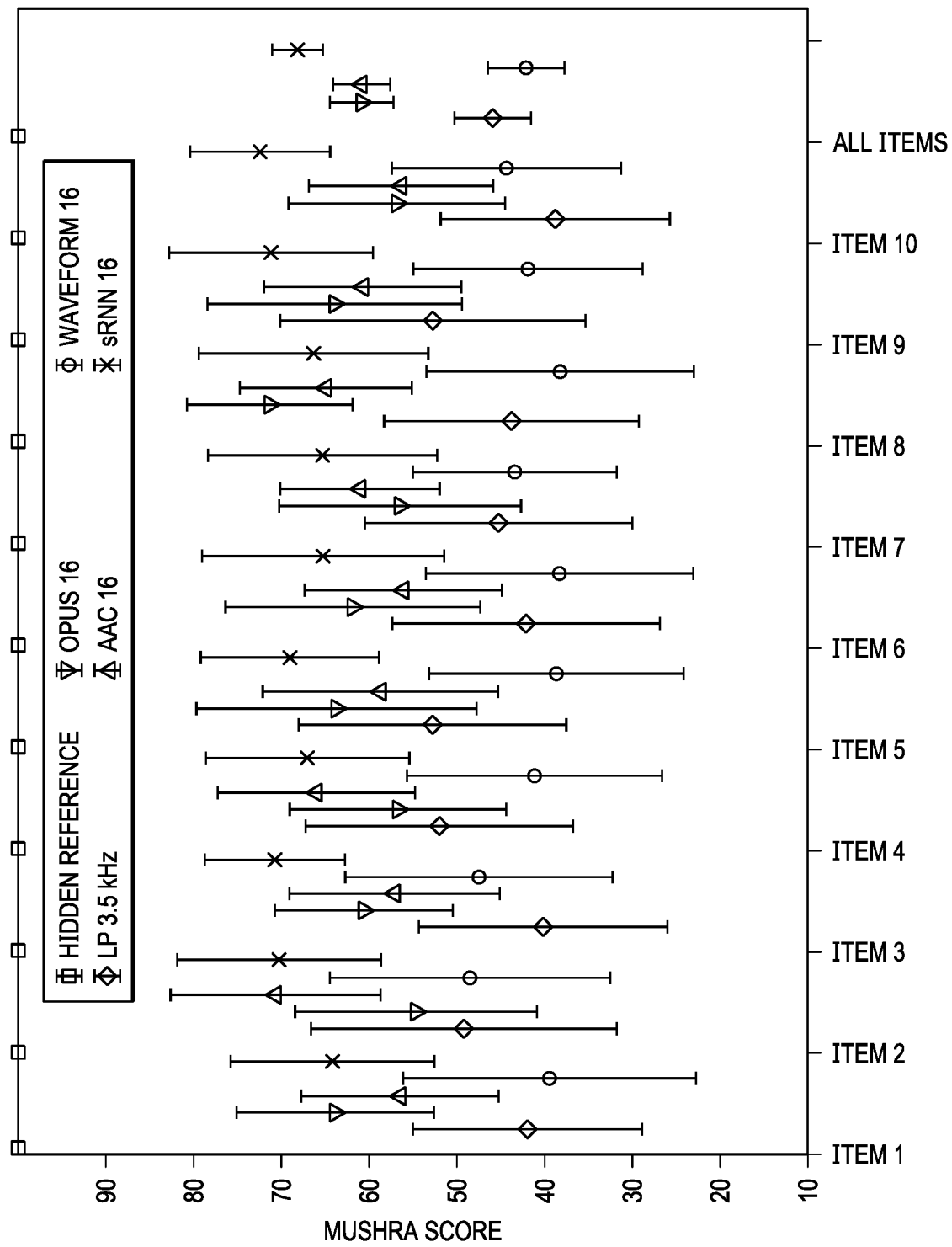
FIG. 9 shows listening test results for a piano coding task.

In a first experiment, the performance was evaluated for a piano coding task. The generative model was trained using the Meastro (MIDI and Audio Edited for Synchronous TRacks and Organization) dataset, a dataset composed of over 200 hours of virtuosic piano performances captured with fine alignment (~3 ms) between note labels and audio waveforms. The dataset was divide into non-overlapping training, validation and test sets. The frame-size used by the $1^{st}$ tier and $2^{nd}$ tear was equal to 8, the frame-size of the $3^{rd}$ tier was equal to 64 and the frame-size of the $4^{th}$ tier was equal to 320. The number of logistic mixture components was equal to 1. A MUSHRA (MUltiple Stimuli with Hidden Reference and Anchor) listening test—as defined by ITU-R BS.1534—was conducted on the test set items and compared to the Opus and the AAC codecs and the baseline waveform coder operating at 16 kb/s. The conditions also included a hidden reference (16 kHz sampling) and a 3.5 kHz low pass anchor ("LP 3.5 kHz"). The results of the first experiment are shown in FIG. 9. It can be seen that the coding method using the generative model ("sRNN 16") significantly outperforms the baseline waveform coder ("Waveform 16"), while being competitive to AAC ("AAC 16") and Opus.

Figure 10:
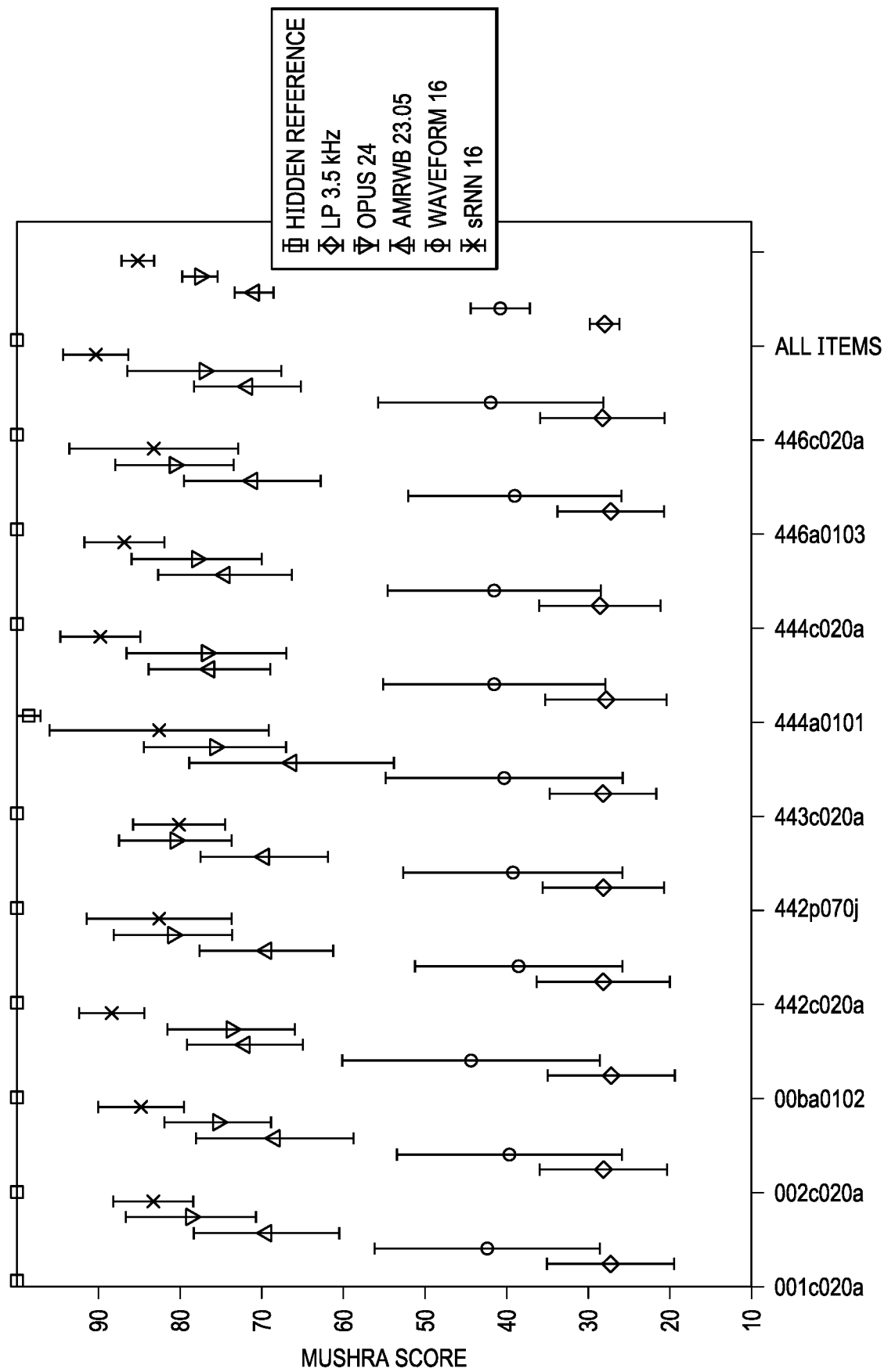
FIG. 10 shows listening test results for a speech coding task.

In a second experiment, the performance for a speech coding task was evaluated. In this case, the generative model was trained using the WSJ0 dataset (Continuous Speech Recognition Pilot Corpus or CSI-I). The dataset includes high-fidelity speech recordings of 123 speakers reading excerpts from the Wall Street Journal. The data set was divided into training, validation and test sets with non-overlapping speakers. The frame-size used by the $1^{st}$ tier and $2^{nd}$ tear was equal to 2, the frame-size of the $3^{rd}$ tier was equal to 16 and the frame-size of the $4^{th}$ tier was equal to 160. The number of logistic mixture components was equal to 10. A MUSHRA test similar to the test described above was conducted, wherein the test set items were compared to the Opus audio codec at 24 kb/s, the AMR-WB (Adaptive Multirate Wideband Speech Codec) codec at 23.05 kb/s and the baseline waveform coder operating at 16 kb/s. The results are shown in FIG. 10. It can be seen that the coding method using the generative model ("sRNN 16") outperforms the waveform baseline ("Waveform 16") by a large margin, while being competitive to the state-of-the-art codecs.

Figure 11B:
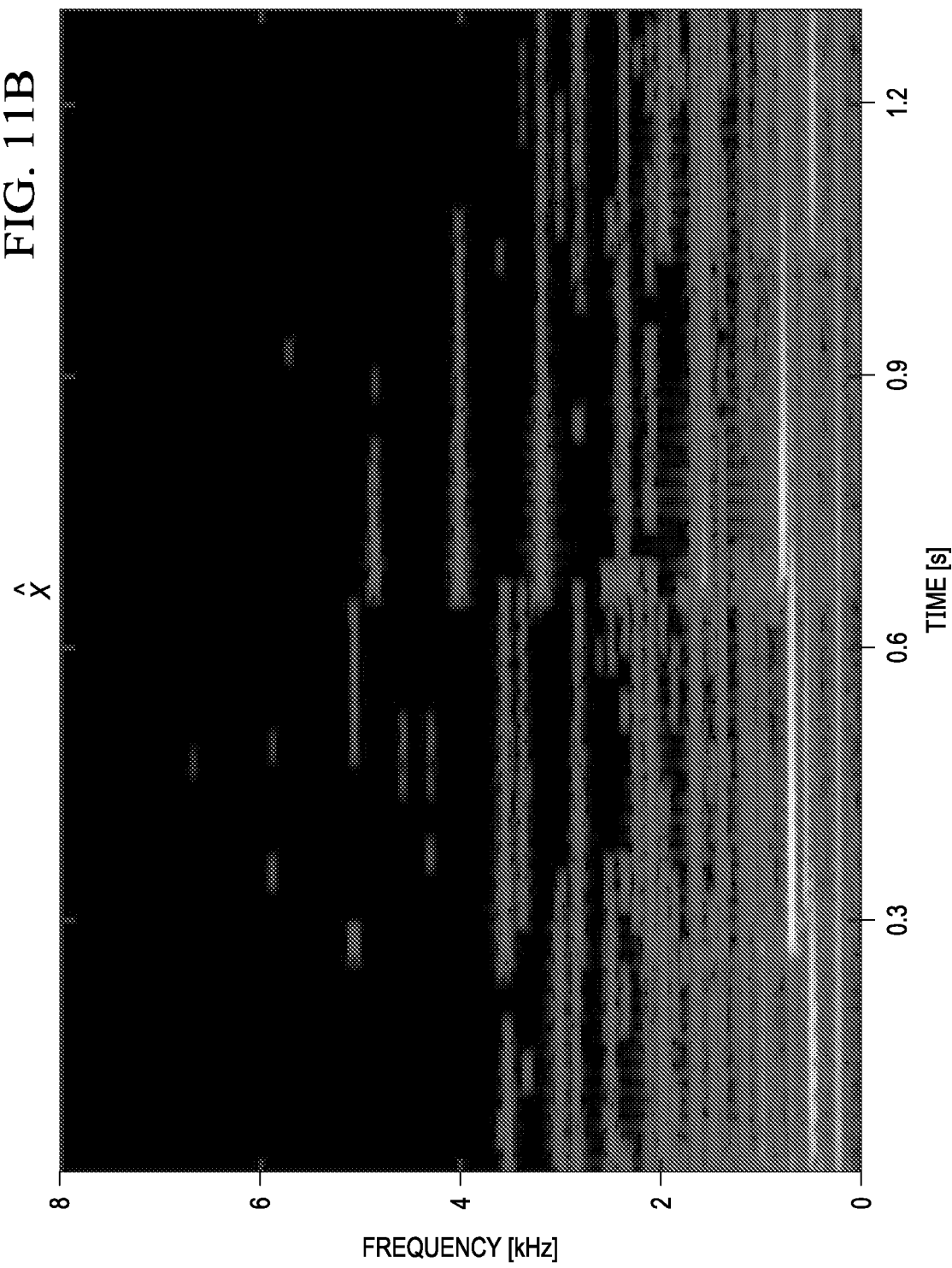
Figure 11C:
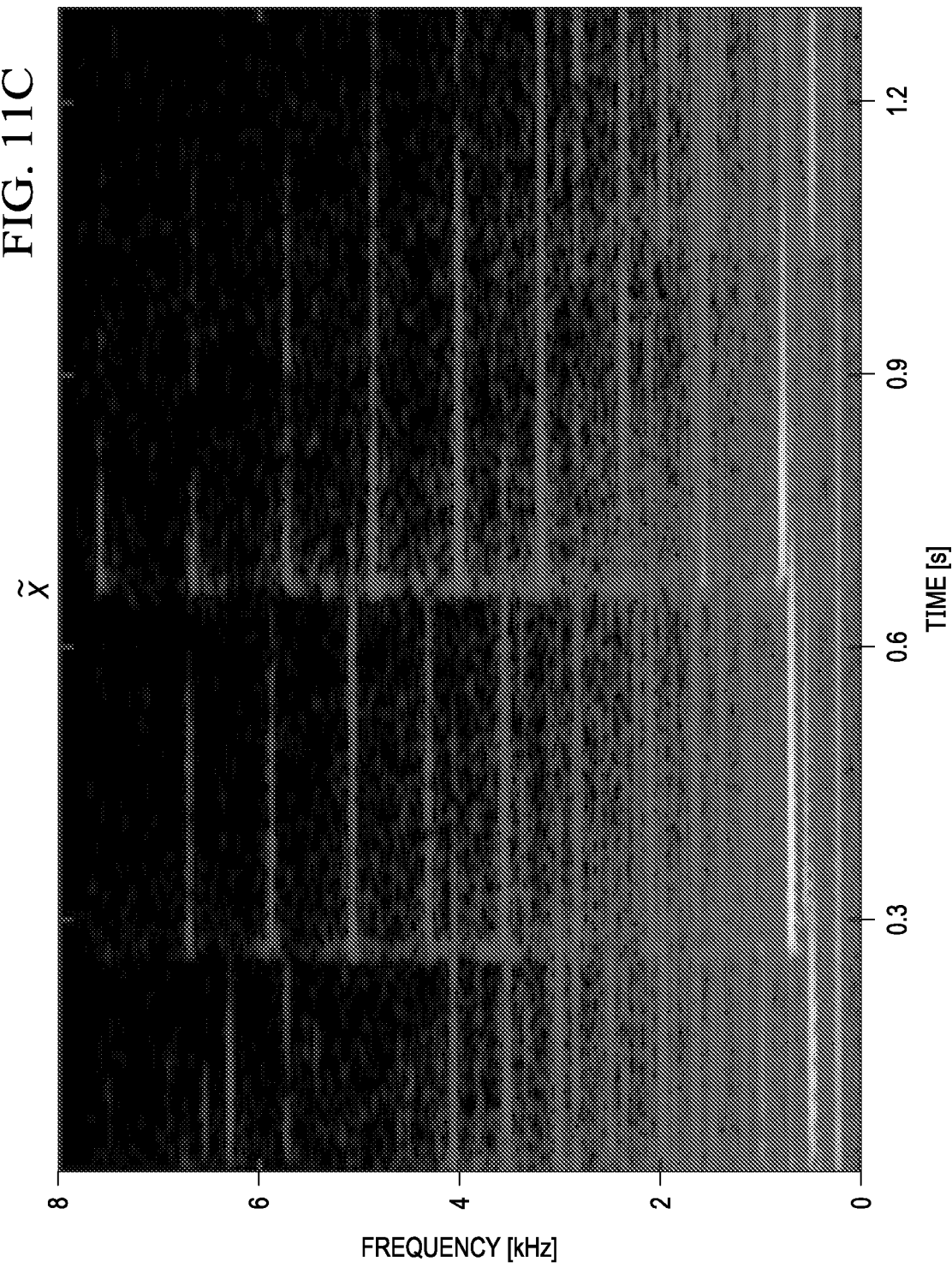

The significant perceptual advantage of the coding method using the generative model over the waveform baseline becomes apparent while inspecting spectrograms of the reconstructed signals. For example, FIGS. 11a-c illustrate spectrograms for the piano coding experiment, with FIG. 11a showing the reference X, FIG. 11b showing the waveform baseline $\hat{X}$ and FIG. 11c showing the reconstructing of the coding method using the generative model $\tilde{X}$.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities. In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, tensor processing unit and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim.

Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE 1. A method of waveform decoding, the method including the steps of:
 (a) receiving, by a waveform decoder, a bitstream including a finite bitrate representation of a source signal;
 (b) waveform decoding the finite bitrate representation of the source signal to obtain a waveform approximation of the source signal;
 (c) providing the waveform approximation of the source signal to a generative model that implements a probability density function, to obtain a probability distribution for a reconstructed signal of the source signal; and
 (d) generating the reconstructed signal of the source signal based on the probability distribution.

EEE 2. Method according to EEE 1, wherein in step (d) the reconstructed signal is generated by generating a random sample according to the probability distribution.

EEE 3. Method according to EEE 1, wherein in step (d) the reconstructed signal is generated by averaging samples according to the probability distribution.

EEE 4. Method according to any of EEEs 1 to 3, wherein in step (a) the received bitstream further includes one or more auxiliary parameters represented at finite bitrate.

EEE 5. Method according to EEE 4, wherein the one or more auxiliary parameters include an indication on an energy per frequency band for at least one frequency band and/or a spectral envelope of the source signal.

EEE 6. Method according to any of EEEs 1 to 5, wherein in step (a) the received bitstream further includes information indicative of a content type of the source signal.

EEE 7. Method according to EEE 6, wherein step (c) further includes selecting the generative model from a predefined set of generative models based on the information indicative of the content type of the source signal.

EEE 8. Method according to EEE 6 or EEE 7, wherein the method further includes a step of determining that the waveform approximation of the source signal shall be output as the reconstructed signal of the source signal based on the information indicative of the content type of the source signal.

EEE 9. Method according to any of EEEs 1 to 8, wherein in step (a) the received bitstream further includes information indicative of an operating bitrate of a coding scheme.

EEE 10. Method according to EEE 9, wherein step (c) further includes selecting the generative model from a predefined set of generative models based on the information indicative of the operating bitrate of the coding scheme.

EEE 11. Method according to EEE 9 or EEE 10, wherein the method further includes a step of determining that the waveform approximation of the source signal shall be output as the reconstructed signal of the source signal based on the information indicative of the operating bitrate of the coding scheme.

EEE 12. Method according to any of EEEs 1 to 11, wherein the generative model operates with a look-ahead.

EEE 13. Method according to any of EEEs 1 to 12, wherein the generative model has been trained to operate in the signal domain.

EEE 14. Method according to any of EEEs 1 to 13, wherein the generative model operates in an autoregressive manner, or wherein the generative model operates to reconstruct an entire frame of the source signal at once.

EEE 15. Method according to EEE 14, wherein the generative model in step (c) is a generative model that implements a conditional probability density function, and wherein the generative model is conditioned on the waveform approximation of the source signal.

EEE 16. Method according to EEE 15, wherein the generative model is further conditioned on the one or more auxiliary parameters.

EEE 17. Method according to EEE 15 or EEE 16, wherein the generative model is a conditional sampleRNN neural network.

EEE 18. Method according to EEE 17, wherein the conditional sampleRNN neural network is a four-tier sampleRNN with the conditioning provided to each tier through convolutional layers.

EEE 19. Method according to any of EEEs 1 to 18, wherein the finite bitrate representation of the source signal has been obtained by a waveform encoder generating a bitstream including the finite bitrate representation of the source signal.

EEE 20. Method according to EEE 19, wherein the waveform encoder is a deterministic waveform encoder.

EEE 21. Method according to EEE 19 or EEE 20, wherein further one or more auxiliary parameters are provided by the waveform encoder and included in the bitstream.

EEE 22. Method according to any of EEEs 19 to 21, wherein further one or more source classifiers providing information indicative of a content type of the source signal are provided by the waveform encoder and included in the bitstream.

EEE 23. Method according to any of EEEs 19 to 22, wherein further information indicative of an operating bitrate of a coding scheme is provided by the waveform encoder and included in the bitstream.

EEE 24. A waveform decoder including:

(a) a receiver configured to receive a bitstream including a finite bitrate representation of a source signal;
(b) a waveform core decoder configured to waveform decode the finite bitrate representation of the source signal to obtain a waveform approximation of the source signal;
(c) a generative model configured to implement a probability density function to obtain a probability distribution for a reconstructed signal of the source signal based on the waveform approximation of the source signal; and
(d) a sampler configured to generate the reconstructed signal of the source signal based on the probability distribution.

EEE 25. Waveform decoder according to EEE 24, wherein the sampler is configured to generate the reconstructed signal by generating a random sample according to the probability distribution.

EEE 26. Waveform decoder according to EEE 24, wherein the sampler is configured to generate the reconstructed signal by averaging samples according to the probability distribution.

EEE 27. Waveform decoder according to any of EEEs 24 to 26, wherein the generative model is conditioned on the waveform approximation of the source signal, and wherein the generative model is configured to implement a conditional probability density function to obtain a conditional probability distribution for the reconstructed signal of the source signal.

EEE 28. Waveform decoder according to EEE 27, wherein the generative model is further conditioned on one or more auxiliary parameters included in the received bitstream.

EEE 29. Waveform decoder according to any of EEEs 24 to 28, wherein the waveform decoder includes a predefined set of generative models, and wherein the waveform decoder further includes a model selector configured to select the generative model to implement the probability density function from the predefined set of generative models based on information indicative of a content type of the source signal included in the received bitstream.

EEE 30. Waveform decoder according to EEE 29, wherein the model selector is further configured to determine that the waveform approximation of the source signal shall be output as the reconstructed signal of the source signal based on the information indicative of the content type of the source signal.

EEE 31. Waveform decoder according to any of EEEs 24 to 30, wherein the model selector is further configured to select the generative model to implement the probability density function from the predefined set of generative models based on information indicative of an operating bitrate of a coding scheme included in the received bitstream.

EEE 32. Waveform decoder according to EEE 31, wherein the model selector is further configured to determine that the waveform approximation of the source signal shall be output as the reconstructed signal of the source signal based on the information indicative of the operating bitrate of the coding scheme.

EEE 33. A method for waveform coding, the method including the steps of:
(a) operating, by a waveform encoder, on a source signal to obtain a bitstream including a finite bitrate representation of the source signal;
(b) receiving, by a waveform decoder, the bitstream including the finite bitrate representation of the source signal;
(c) waveform decoding the finite bitrate representation of the source signal to obtain a waveform approximation of the source signal;
(d) providing the waveform approximation of the source signal to a generative model that implements a probability density function, to obtain a probability distribution for a reconstructed signal of the source signal; and
(e) generating the reconstructed signal of the source signal based on the probability distribution.

EEE 34. A system for waveform coding, wherein the system includes a waveform encoder and a waveform decoder, and wherein the system is configured to perform the method according to EEE 33.

EEE 35. A method of training a generative model, the method including the steps of:
(a) providing an original signal of a source signal;
(b) waveform encoding and decoding the original signal of the source signal to obtain a waveform approximation of the source signal;
(c) inputting the waveform approximation of the source signal into the generative model to obtain a parametrized function for a probability distribution; and
(d) tuning the parameters of the generative model to maximize a likelihood of the original source signal based on the probability distribution obtained from said generative model.

EEE 36. Method according to EEE 35, wherein the generative model is conditioned on the waveform approximation of the source signal.

EEE 37. Method according to EEE 36, wherein the generative model is further conditioned on one or more auxiliary parameters.

EEE 38 Method according to any of EEEs 35 to 37, wherein in step (d) the parameters of the generative model are tuned based on minimizing a mean over a dataset of a Negative-Log-Likelihood.

EEE 39. Method according to any of EEEs 35 to 37, wherein in step (c) further a reconstructed signal of the source signal is generated based on the probability distribution, and wherein in step (d) the parameters of the generative model are tuned based on minimizing an indication of a difference between the reconstructed signal of the source signal and the original signal of the source signal.

EEE 40. A computer program product comprising a computer-readable storage medium with instructions adapted to cause the device to carry out the method according to any of EEEs 1 to 23 when executed by a device having processing capability.

EEE 41. A computer program product comprising a computer-readable storage medium with instructions adapted to cause the device to carry out the method according to EEE 33 when executed by a device having processing capability.

EEE 42. A computer program product comprising a computer-readable storage medium with instructions adapted to cause the device to carry out the method according to any of EEEs 35 to 39 when executed by a device having processing capability.

The invention claimed is:
1. A method of waveform decoding, the method including the steps of:
(a) receiving, by a waveform decoder, a bitstream including a finite bitrate representation of a source signal;
(b) waveform decoding the finite bitrate representation of the source signal to obtain a waveform approximation of the source signal;

(c) providing the waveform approximation of the source signal to a generative model at the waveform decoder that implements a probability density function, to obtain a probability distribution for a reconstructed signal of the source signal; and (d) generating the reconstructed signal of the source signal based on the probability distribution.

2. The method according to claim 1, wherein the generative model operates in an autoregressive manner, or wherein the generative model operates to reconstruct an entire frame of the source signal at once.

3. The method according to claim 2, wherein the generative model in step (c) is a generative model that implements a conditional probability density function, and wherein the generative model is conditioned on the waveform approximation of the source signal and optionally on one or more auxiliary parameters.

4. The method according to claim 3, wherein the generative model is a conditional sampleRNN neural network, and wherein optionally the conditional sampleRNN neural network is a four-tier sampleRNN with the conditioning provided to each tier through convolutional layers.

5. The method according to claim 1, wherein in step (a) the received bitstream further includes information indicative of a content type of the source signal, and/or wherein in step (a) the received bitstream further includes information indicative of an operating bitrate of a coding scheme.

6. The method according to claim 5, wherein step (c) further includes selecting the generative model from a predefined set of generative models based on the information indicative of the content type of the source signal, and/or wherein step (c) further includes selecting the generative model from a predefined set of generative models based on the information indicative of the operating bitrate of the coding scheme.

7. The method according to claim 5, wherein the method further includes a step of determining that the waveform approximation of the source signal shall be output as the reconstructed signal of the source signal based on the information indicative of the content type of the source signal and/or based on the information indicative of the operating bitrate of the coding scheme.

8. The method according to claim 1, wherein the finite bitrate representation of the source signal has been obtained by a waveform encoder generating a bitstream including the finite bitrate representation of the source signal, and wherein optionally further one or more auxiliary parameters are provided by the waveform encoder and included in the bitstream.

9. The method according to claim 8, wherein the waveform encoder is a deterministic waveform encoder.

10. The method according to claim 8, wherein further one or more source classifiers providing information indicative of a content type of the source signal are provided by the waveform encoder and included in the bitstream, and/or wherein further information indicative of an operating bitrate of a coding scheme is provided by the waveform encoder and included in the bitstream.

11. The method of claim 1, wherein the generative model is one of a plurality of generative models at the waveform decoder.

12. The method of claim 11, wherein each generative model of the plurality of generative models is separately trained with respect to a target operating bitrate.

13. The method according to claim 1, wherein in step (d) the reconstructed signal is generated by generating a random sample according to the probability distribution or wherein in step (d) the reconstructed signal is generated by averaging samples according to the probability distribution.

14. The method according to claim 1, wherein in step (a) the received bitstream further includes one or more auxiliary parameters represented at finite bitrate, and wherein optionally the one or more auxiliary parameters include an indication on an energy per frequency band for at least one frequency band and/or a spectral envelope of the source signal.

15. The method according to claim 1, wherein the generative model operates with a look-ahead.

16. The method according to claim 1, wherein the generative model has been trained to operate in a signal domain.

17. A waveform decoder including:
(a) a receiver configured to receive a bitstream including a finite bitrate representation of a source signal;
(b) a waveform core decoder configured to waveform decode the finite bitrate representation of the source signal to obtain a waveform approximation of the source signal;
(c) a generative model at the waveform decoder configured to implement a probability density function to obtain a probability distribution for a reconstructed signal of the source signal based on the waveform approximation of the source signal; and
(d) a sampler configured to generate the reconstructed signal of the source signal based on the probability distribution.

18. The waveform decoder of claim 17, wherein the generative model is one of a plurality of generative models at the waveform decoder.

19. The waveform decoder of claim 18, wherein each generative model of the plurality of generative models is separately trained with respect to a target operating bitrate.

* * * * *